(12) United States Patent  (10) Patent No.: US 9,132,490 B2
Ramun  (45) Date of Patent: Sep. 15, 2015

(54) INTERLOCKING TIP FOR DEMOLITION AND CONSTRUCTION EQUIPMENT

(76) Inventor: John R. Ramun, Poland, OH (US)

( * ) Notice: Subject to any disclaimer, the term of this patent is extended or adjusted under 35 U.S.C. 154(b) by 291 days.

(21) Appl. No.: 13/493,166

(22) Filed: Jun. 11, 2012

(65) Prior Publication Data
US 2013/0327868 A1 Dec. 12, 2013

(51) Int. Cl.
B02C 1/02 (2006.01)
B23D 35/00 (2006.01)
E02F 3/96 (2006.01)
E02F 9/28 (2006.01)
E04G 23/08 (2006.01)
B23D 31/00 (2006.01)

(52) U.S. Cl.
CPC ............ B23D 35/001 (2013.01); B23D 35/002 (2013.01); E02F 3/965 (2013.01); E02F 9/2833 (2013.01); E02F 9/2875 (2013.01); E02F 9/2883 (2013.01); E04G 23/082 (2013.01); B23D 31/008 (2013.01); Y10T 29/49947 (2015.01)

(58) Field of Classification Search
CPC ................... B23C 2200/168; B23C 2200/361; B23D 17/00; B02C 1/10
USPC .............. 241/264, 266, 101.73, 300; 30/134, 30/228; 83/13; 407/66
See application file for complete search history.

(56) References Cited

U.S. PATENT DOCUMENTS

| | | | |
|---|---|---|---|
| 4,403,431 A | 9/1983 | Ramun et al. | |
| 4,670,983 A | 6/1987 | Ramun et al. | |
| 4,897,921 A | 2/1990 | Ramun | |
| 5,044,569 A | 9/1991 | LaBounty et al. | |
| 5,187,868 A | 2/1993 | Hall | |
| 5,209,611 A | 5/1993 | Drescher | |
| 5,339,525 A | 8/1994 | Morikawa | |
| 5,474,242 A * | 12/1995 | Rafn | 241/101.71 |
| 5,619,881 A * | 4/1997 | Morikawa et al. | 72/330 |
| 5,671,892 A * | 9/1997 | Morikawa et al. | 241/101.73 |
| 5,894,666 A | 4/1999 | Hrusch | |
| 5,926,958 A | 7/1999 | Ramun | |
| 5,940,971 A | 8/1999 | Ramun | |
| 5,992,023 A | 11/1999 | Sederberg et al. | |

(Continued)

FOREIGN PATENT DOCUMENTS

DE 1278375 B 9/1968
DE 10243308 A1 4/2004

(Continued)

OTHER PUBLICATIONS

Genesis "XP Mobile Shears," product advertisement dated Apr. 2003, 2 pages.

Primary Examiner — Shelley Self
Assistant Examiner — Leonel Vasquez
(74) Attorney, Agent, or Firm — The Webb Law Firm

(57) ABSTRACT

A tip for demolition and construction equipment has a discrete base with at least one recess therein to accept a replaceable insert. The insert has a projection that fits within a mating socket within the base. A threaded bolt may extend through a common bore within the insert and base to secure the insert to the base. The tip may also include a second opposing insert which is held within a respective recess by a common bolt. Finally, each insert may have a key which interlocks within a keyway of the base recess to securely hold the insert within the base and to distribute forces created by a cutting operation over a greater area.

19 Claims, 14 Drawing Sheets

(56) References Cited

U.S. PATENT DOCUMENTS

| | | | |
|---|---|---|---|
| 6,061,911 A | | 5/2000 | LaBounty et al. |
| 6,119,970 A | | 9/2000 | LaBounty et al. |
| 6,132,146 A | * | 10/2000 | Satran et al. .................. 407/40 |
| 6,202,308 B1 | | 3/2001 | Ramun |
| 6,270,292 B1 | * | 8/2001 | Satran et al. .................. 407/42 |
| 6,438,874 B1 | | 8/2002 | LaBounty et al. |
| 6,839,969 B2 | | 1/2005 | Jacobson et al. |
| 6,926,217 B1 | | 8/2005 | LaBounty et al. |
| 7,044,037 B2 | | 5/2006 | Cossette et al. |
| 7,632,046 B2 | * | 12/2009 | Andersson et al. ............ 407/46 |
| 8,327,547 B2 | * | 12/2012 | Johnson et al. ................ 30/134 |
| 2007/0130776 A1 | * | 6/2007 | Grant et al. .................... 30/134 |
| 2008/0072434 A1 | * | 3/2008 | Clemons et al. ............... 30/134 |
| 2012/0111171 A1 | * | 5/2012 | Johnson et al. ................ 83/821 |
| 2012/0255181 A1 | * | 10/2012 | Johnson et al. ................ 30/194 |

FOREIGN PATENT DOCUMENTS

| | | |
|---|---|---|
| EP | 0666131 A1 | 8/1995 |
| JP | 55104656 A | 8/1980 |
| JP | 3027938 U | 8/1996 |
| JP | 8206910 A | 8/1996 |
| JP | 9195528 A | 7/1997 |
| JP | 10259669 A | 9/1998 |
| JP | 2003512182 A | 4/2003 |
| WO | 0128687 A1 | 4/2001 |
| WO | 2008039524 A1 | 4/2008 |

* cited by examiner

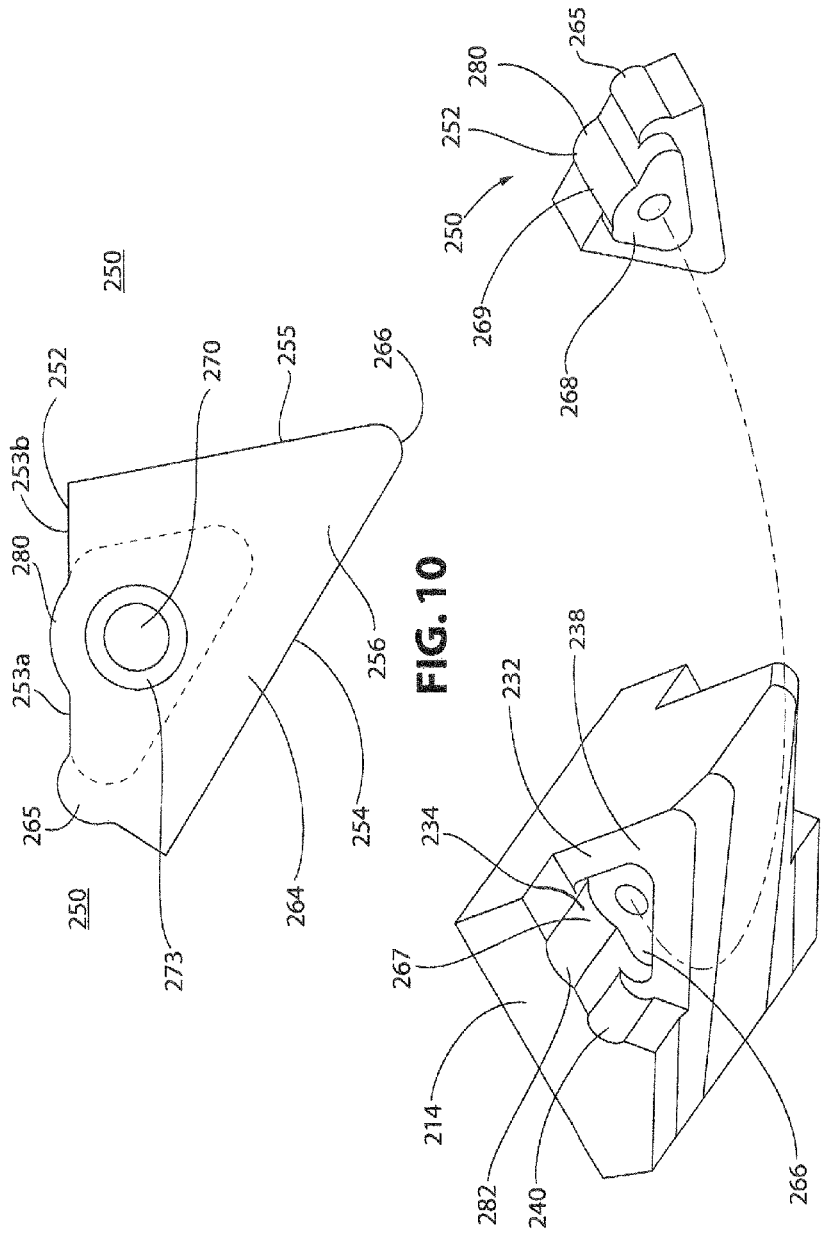

INTERLOCKING TIP FOR DEMOLITION AND CONSTRUCTION EQUIPMENT

BACKGROUND OF THE INVENTION

1. Field of the Invention

The present invention relates to a tip used for construction or demolition equipment which is adapted to be attached to a support and used in conjunction with, for example, a heavy-duty metal cutting shear, a plate shear, a concrete crusher, a grapple, or other construction or demolition equipment. More particularly, the present invention relates to a replaceable tip secured to a support.

2. Description of Related Art

For purposes of discussion herein, demolition and construction equipment may also be referred to as scrap handling equipment. The description of demolition equipment and construction equipment herein is not intended to be restrictive of the equipment being referenced. Demolition equipment, such as heavy-duty metal cutting shears, grapples, and concrete crushers are mounted on backhoes powered by hydraulic cylinders for a variety of jobs in the demolition field. This equipment provides for the efficient cutting and handling of scrap. For example, in the dismantling of an industrial building, metal scrap, in the form of various diameter pipes, structural I-beams, channels, angles, sheet metal plates, and the like must be efficiently severed and handled by heavy duty metal shears. Such shears can also be utilized for reducing automobiles, truck frames, railroad cars, and the like. The shears must be able to move and cut the metal scrap pieces regardless of the size or shape of the individual scrap pieces and without any significant damage to the shears. In the demolition of an industrial building, concrete crushing devices, such as a concrete pulverizer or concrete crackers, are also used to reduce the structure to manageable components which can be easily handled and removed from the site. Wood shears and plate shears also represent specialized cutting devices useful in particular demolition or debris removal situations depending on the type of scrap. Also, a grapple is often utilized where handling of debris or work pieces is a primary function of the equipment. Historically, all of these pieces of equipment represent distinct tools having significant independent capital cost. Consequently, the demolition industry has tended to develop one type of tool that can be used for as many of these applications as possible.

For illustrative purposes, the following discussion will be directed to metal shears. One type of metal shear is a shear having a fixed blade and a movable blade pivoted thereto. The movable blade is pivoted by a hydraulic cylinder to provide a shearing action between the blades for severing the work pieces. Examples of this type of shears can be found in prior U.S. Pat. Nos. 4,403,431; 4,670,983; 4,897,921; 5,926,958; and 5,940,971 which are assigned to the Assignee of this application and which are herein incorporated in their entirety by reference.

FIG. 1 illustrates a prior art, multiple tool attachment adapted to be attached to demolition or construction equipment, such as a backhoe (not shown). The multiple tool attachment is adapted to connect one of a series of tools or tool units to the demolition equipment. The tool attached in FIG. 1 is a metal shear 10. The shear 10 includes a first blade 12 connected to an upper jaw 13 and a second blade 14 connected to a lower jaw 15, wherein the jaws 13, 15 are pivotally connected at a hub or main pin 16 to a universal body 18. The body 18 is referred to as universal because it remains common to a series of tools or tool units in the attachment system. The universal body 18 is comprised of sides 19, a bearing housing 20, and a yoke 21.

The upper jaw 13 and the lower jaw 15 pivot about the main pin 16 to form a movable jaw assembly 22. At the end of the first blade 12 is a blade tip 24. Details of the blade tip 24 are provided in FIGS. 3 and 4, wherein the blade tip 24 is comprised of a base 26 having a top side 28, bottom side 30, and walls 32, 34 therebetween. The base 26 of the blade tip 24 is a completely solid piece and the top side 28 of the base 26 is secured to a support 36 associated with the upper jaw 13.

Directing attention to FIGS. 1 and 2, the second blade 14 has associated with it a guide channel 38 which accepts and provides lateral support to the blade tip 24 and the first blade 12. To minimize the deflection experienced under load by the first blade 12 and the blade tip 24, the tolerance for the guide channel 38 is fairly low.

In many applications, the first blade 12 and support 36 may be laterally displaced relative to the guide channel 38, such that upon entering the guide channel 38 the side of the blade tip 24 experiences rubbing and extensive wear during normal operation. This wear, if not properly maintained, can lead to the first blade 12 becoming jammed or stuck in the guide channel 38. This condition is known as "stickers" in the industry. Stickers can develop when the clearance gap between the walls 32, 34 of the tip 24 of the first blade 12 and the walls 40, 42 of the guide channel 38 of the lower blade 14 become excessive enough to allow material to become wedged between these surfaces while shearing. Once the first blade 12 becomes stuck within the guide channel 38, the shear 10 must oftentimes be decommissioned for repair. It is then necessary to build up the walls 32, 34 of the tip 24 by welding to keep these gaps at a minimum. This process is very time consuming and costly and, depending on the material that the shear is processing, building up the tip could be required as often as once a week.

FIG. 5 illustrates a prior art design of a blade tip 100 having a base 114 with a recess 132 to accept replaceable inserts 150, 185. Each insert, for example insert 150, has a generally planar top side 152 that mates with the upper side 134 of the recess 132. Additionally, non-circular projections 168 extend from the inserts 150 and fit within matching sockets 166 within the base 114. A common bore 170 extends through the insert 150, the base 114, and an opposing insert 185. A fastener 172 passes through the common bore 170 and secures the inserts 150, 185 within their respective recesses 132, 182. The fastener 172 may be a threaded bolt having a bolt head 174 and a threaded shaft 176 mated with a threaded nut 186.

A tip design is desired that may be easily repaired or replaced when worn to minimize the down time of a shear or other equipment.

Furthermore, a tip design is desired to more uniformly distribute the load generated by cutting forces on the inserts 150, 185 to the base 114.

SUMMARY OF THE INVENTION

A tip for demolition and construction equipment comprising discrete base having a top side, a bottom side, a front side, and walls therebetween; a generally planar mounting surface on the top side of the base adapted to be secured to a support; a central portion with a cutting edge, whereby the cutting edge is defined at the lowermost portion of the bottom side of the base at the intersection with the front side; and a recess extending into at least one wall of the base, wherein the recess defines a recess upper side, an inner wall and a recess contour; wherein the recess upper side has generally planar sections and extends in a direction parallel to the mounting surface and; wherein the recess further includes a keyway adjacent to the generally planar sections of the upper side; and an insert having a top side, a bottom side, a front side, and walls therebetween; a cutting edge defined at the lowermost portion of the bottom side of the insert at the intersection with the front side; and a profile which generally conforms to the recess contour, wherein the top side has generally planar sections and further includes a key protruding from and adjacent to the generally planar sections of the top side; and wherein an insert is secured within each recess such that the top side of the insert mates with the upper side of the recess and wherein the keyway is engaged by the key to provide an interlocking arrangement between the base and the insert.

An insert for use with a tip for demolition or construction equipment, wherein the tip has a discrete base with a top side, a bottom side and walls therebetween, a mounting surface on the top side of the base adapted to be secured to a support, a central portion with a cutting edge, whereby the cutting edge is defined at the lowermost portion of the bottom side of the base, and a recess extending into at least one side of the base, wherein the recess defines at least a recess upper wall, an inner side and a recess contour, wherein the insert comprises a body having a top side, a bottom side, a front side and walls therebetween; a cutting edge defined at the intersection of two walls; and a profile which generally conforms to the recess contour, wherein the top side has generally planar sections and further includes a key protruding from and adjacent to the generally planar sections of the top side, wherein the keyway is comprised of a radiussed segment within the base, wherein the segment has at an end closest to the front side a terminal defined by a radial line forming a front angle F of between 1-90 degrees with the generally planar mounting sections and having an end furthest from the front side a terminal defined by a radial line forming a back angle B of between 180 and 270 degrees with the generally planar mounting sections.

Demolition and construction equipment having a support and mounted upon the support a tip comprising a discrete base having a top side, a bottom side, a front side, and walls therebetween; a generally planar mounting surface on the top side of the base adapted to be secured to a support; a central portion with a cutting edge, whereby the cutting edge is defined at the lowermost portion of the bottom side of the base at the intersection with the front side; and a recess extending into at least one wall of the base, wherein the recess defines a recess upper side, an inner wall and a recess contour; wherein the recess upper side has generally planar sections and extends in a direction parallel to the mounting surface and; wherein the recess further includes a keyway within the generally planar sections of the upper side; and an insert having a top side, a bottom side, a front side, and walls therebetween; a cutting edge defined at the lowermost portion of the bottom side of the insert at the intersection with the front side; and a profile which generally conforms to the recess contour, wherein the top side has generally planar sections and further includes a key protruding from and adjacent to the generally planar sections of the top side; and wherein an insert is secured within each recess such that the top side of the insert mates with the upper side of the recess and wherein the keyway is engaged by the key to provide an interlocking arrangement between the base and the insert.

A method of securing inserts within a tip for demolition and construction equipment having a discrete base with a top side, a bottom side and walls therebetween, a mounting surface on the top side of the base adapted to be secured to a support, a central portion with a cutting edge, whereby the cutting edge is defined at the lowermost portion of the bottom side of the base, and a recess extending into two opposing walls of the base, wherein each recess defines a recess upper wall, an inner side and a recess contour, wherein the base recess includes a keyway adjacent to the generally planar sections of the upper side and wherein the insert top side has generally planar sections and includes a key adjacent to and protruding from the generally planar sections of the top side, wherein the method comprises the steps of providing a common bore through the insert and the walls of the base at each recess; positioning an insert within each recess; inserting a fastener therethrough; and securing the fastener against each insert within the recess.

BRIEF DESCRIPTION OF THE DRAWINGS

FIG. 10 is a side view of an insert that fits within the base;

FIG. 11 is an exploded perspective view illustrating the manner in which the insert fits within the base;

DESCRIPTION OF THE PREFERRED EMBODIMENTS

Figure 1:
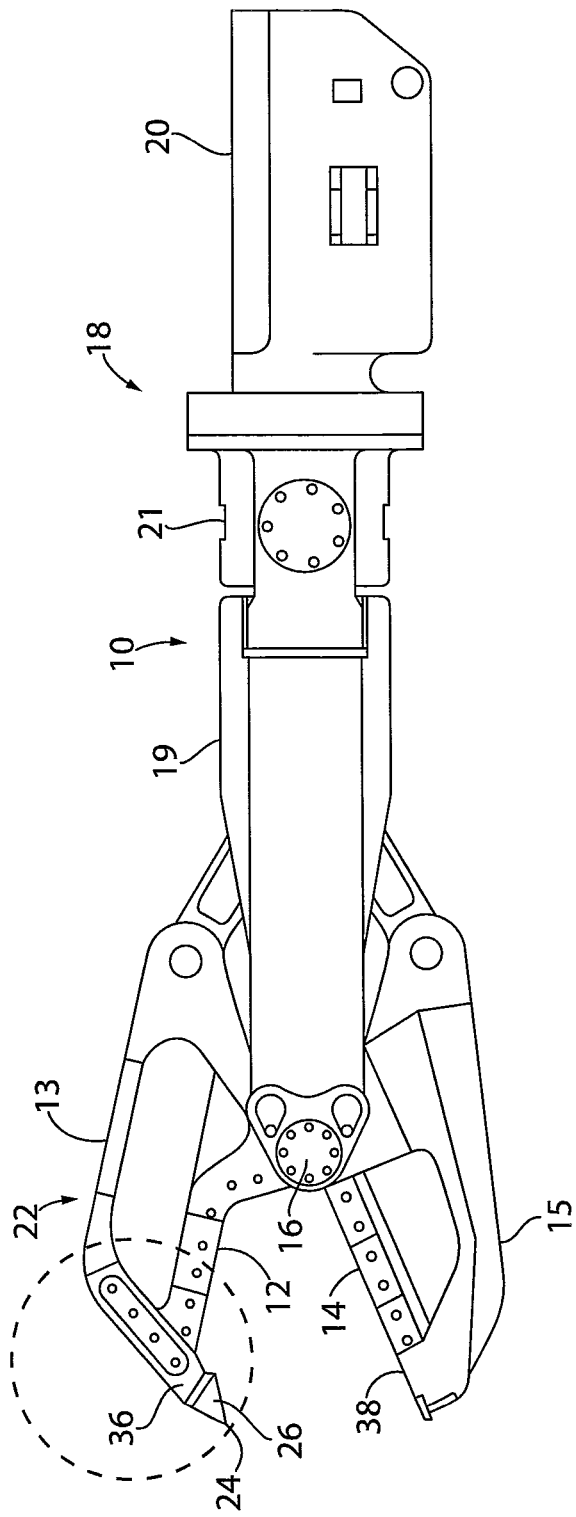
FIG. 1 is prior art and is a side view illustrating a metal shear incorporated into a universal body for a construction tool system.
Figure 2:
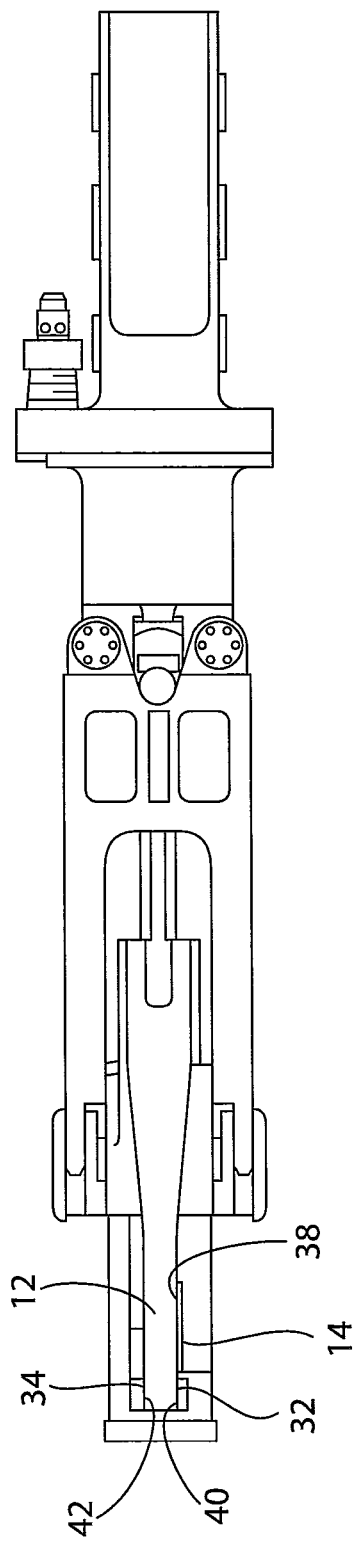
FIG. 2 is prior art and is a plan view of the shear in FIG. 1.
Figure 3:
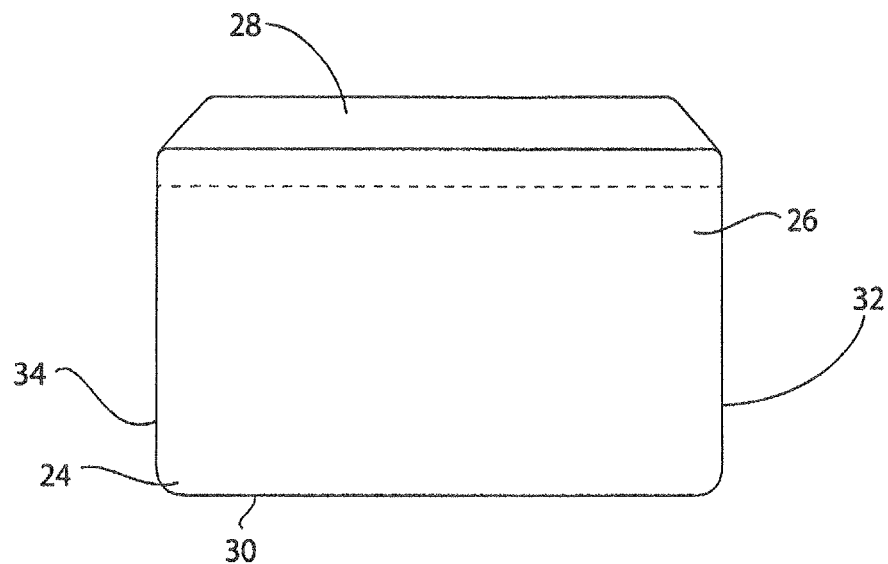
FIG. 3 is prior art and is a front view of a blade tip.
Figure 4:
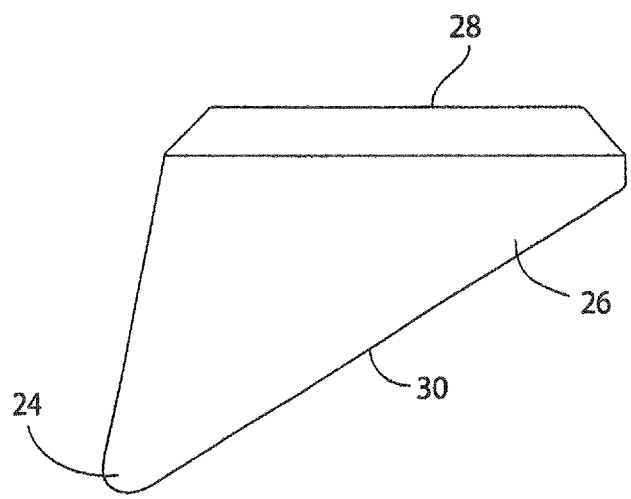
FIG. 4 is prior art and is a side view of the blade tip shown in FIG. 3.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 6:
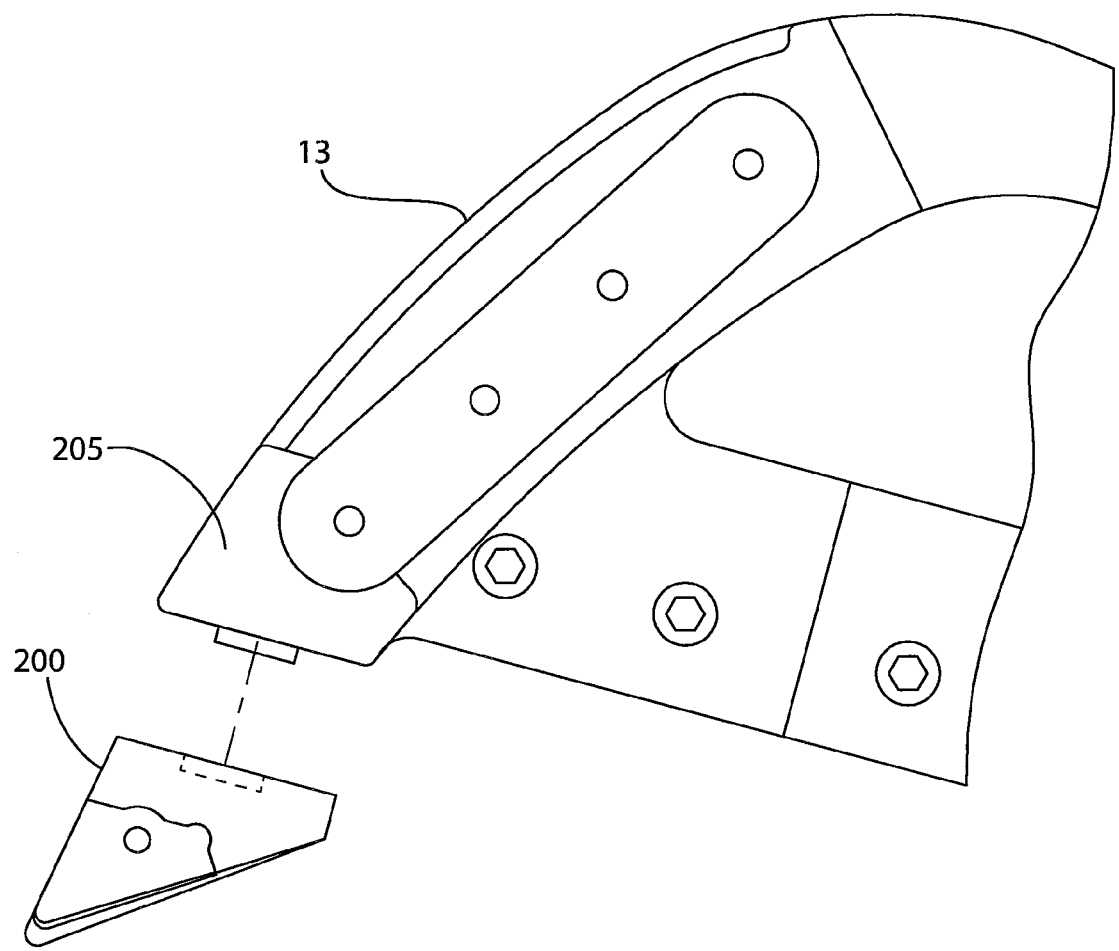
FIG. 6 is a side view of a blade tip in accordance with the subject invention.

FIG. 6 illustrates a blade tip 200 secured to a support 205 such as the upper jaw 13 of the jaw assembly 22 used in an industrial shear. It should be appreciated that although this tip 200 will be discussed in the context of an industrial shear associated with the demolition equipment, such a blade tip 200, can be implemented on any type of equipment that shears, cuts, cracks, crunches, or processes any type of material by motion of the blade tip.

The blade tip 200 may be utilized, for example, as a shear, tip, claw, tooth, crusher tooth, and any and all piercing/punching devices that currently exist or that may be developed. This tip has immediate application for products which add shears, claws, scrapples, crushers, crackers, rail breakers, multi-blade cutters, tree shears, ripper teeth, grinding teeth, shearing teeth, and any mechanism that can utilize a disposable cutting part which is subjected to wear.

Figure 7:
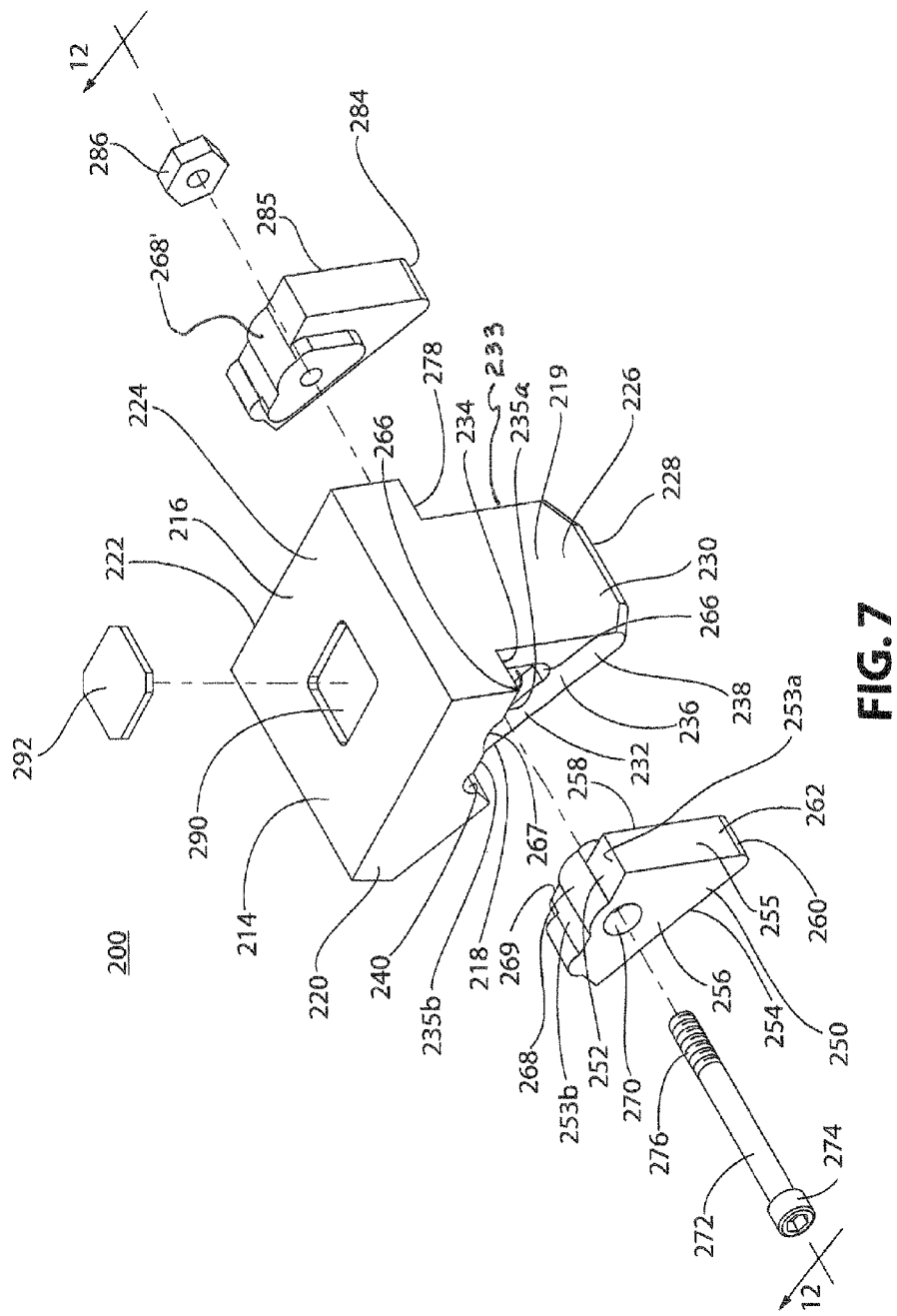
FIG. 7 is an exploded perspective view of the blade tip in accordance with the subject invention.
Figure 8:
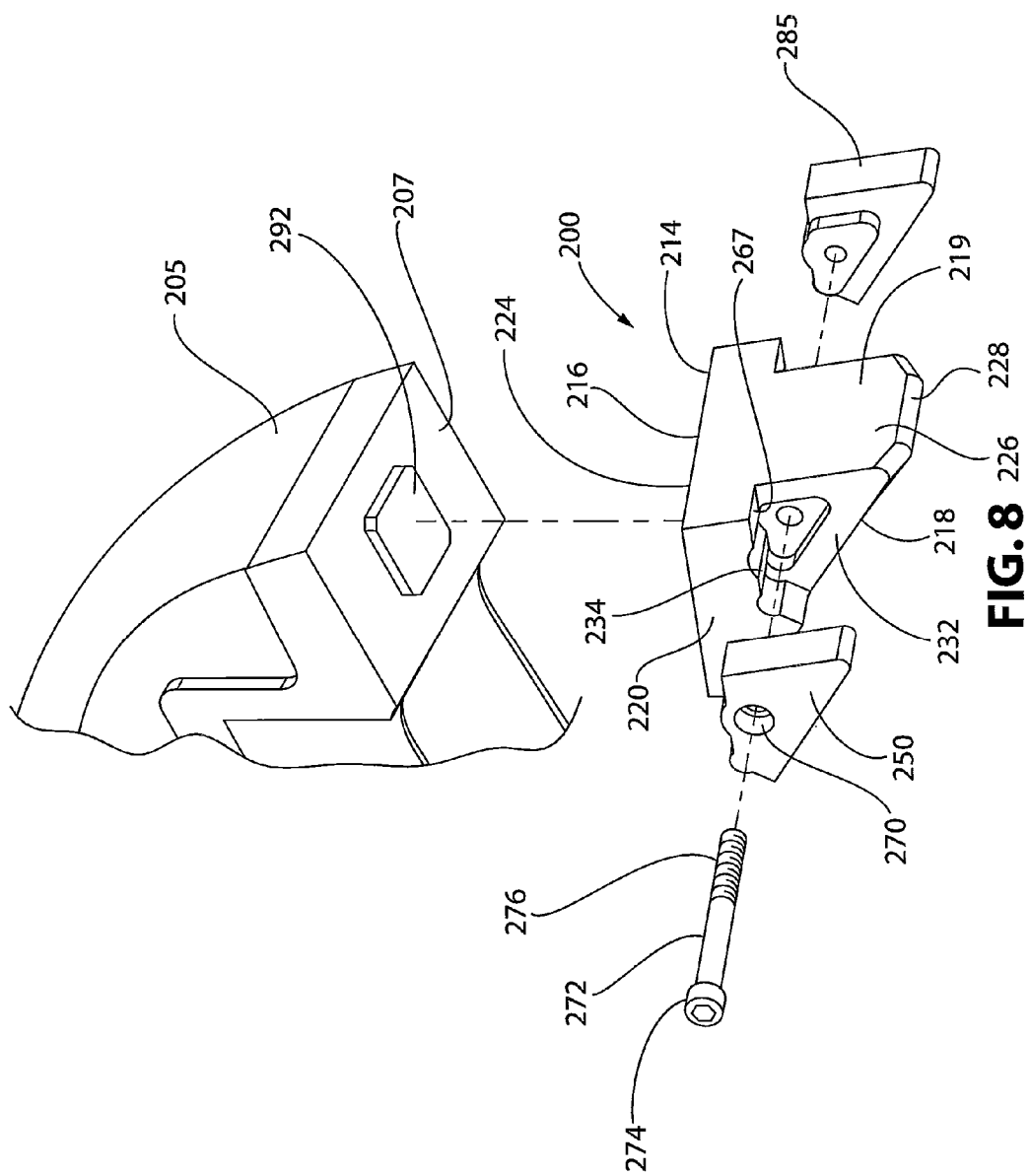
FIG. 8 is a different exploded perspective view of the blade tip in FIG. 7.
Figure 9:
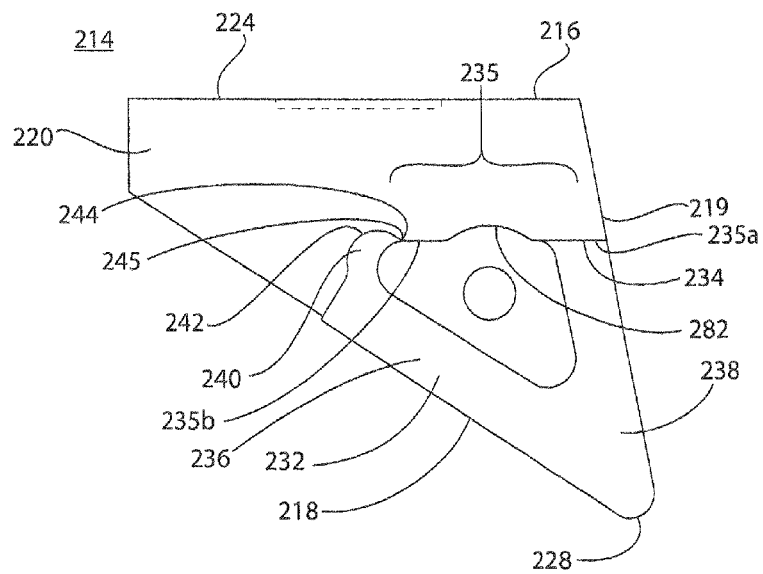
FIG. 9 is a side view of the base.

Directing attention to FIGS. 7-10, the tip 200 is comprised of a discrete base 214 having a top side 216, a bottom side 218, a front side 219, and walls 220, 222 therebetween. The base 214 has a generally planar mounting surface 224 on the top side 216, wherein the mounting surface 224 is adapted to be secured to the support 205 (FIG. 6). The base 214 has a central portion 226 with a cutting edge 228, whereby the cutting edge 228 is defined at the lower most portion 230 of the bottom side 218 of the base 214 at the intersection with the front side 219. A recess 232, 233 extends into each wall 220, 222 of the base 214. The recess 232 defines a recess upper side 234, a recess inner wall 236, and generally planar sections 235a, 235b defining a recess contour 238 (FIG. 9). While the recess 232 extending into wall 220 will be explained in detail, it should be appreciated that the recess 233 extending into wall 222 is identical and is a mirror image.

Directing attention to insert 250, the insert 250 has a top side 252, a bottom side 254, a front side 255, and walls 256, 258 therebetween. A cutting edge 260 is defined at the lower most portion 262 of the bottom side 254 of the insert 250.

Figure 9A:
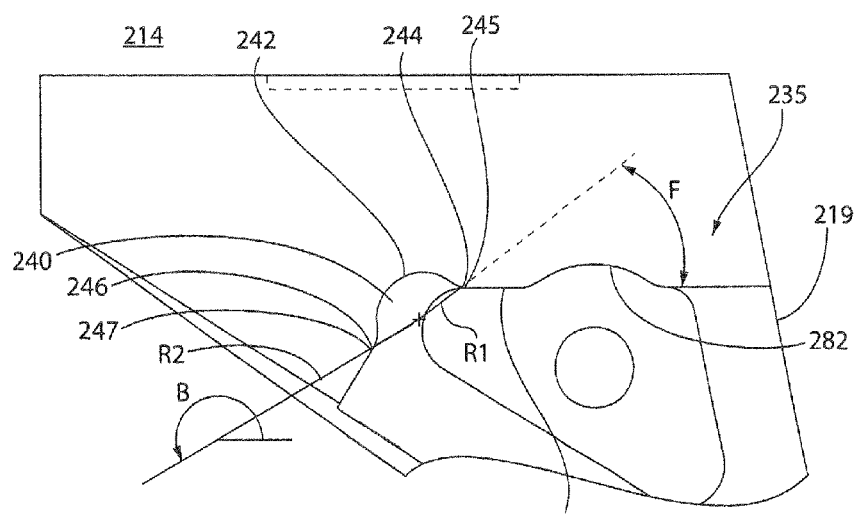
FIG. 9A is an enlarged portion of FIG. 9.

As illustrated in FIGS. 9 and 9A, the recess upper side 234 has generally planar sections 235a, 235b and extends in a direction parallel to the mounting surface 224. The recess 232 further includes a keyway 240 adjacent to the generally planar sections 235a, 235b of the upper side 234.

Directing attention to FIGS. 10 and 11, the profile 264 of the insert 250 generally conforms to the contour 238 of the recess 232 of the base 214. The top side 252 of the insert 250 has generally planar sections 253a, 253b and further includes a key 265 protruding from the generally planar sections 253a, 253b of the top side 252. As a result, the insert 250 may be secured within the recess 232 such that the top side 252 of the insert mates with the upper side 234 of the recess 232, wherein the keyway 240 of the base 214 is engaged by the key 265 of the insert 250 to provide an interlocking arrangement between the base 214 and the insert 250. The profile 264 of the insert 250 generally conforms to the contour 238 of the recess 232. The recess contour 238 is triangular and the profile 264 of the tip 250 corresponds to that shape. The insert 250 is secured within the recess 232.

Figure 12:
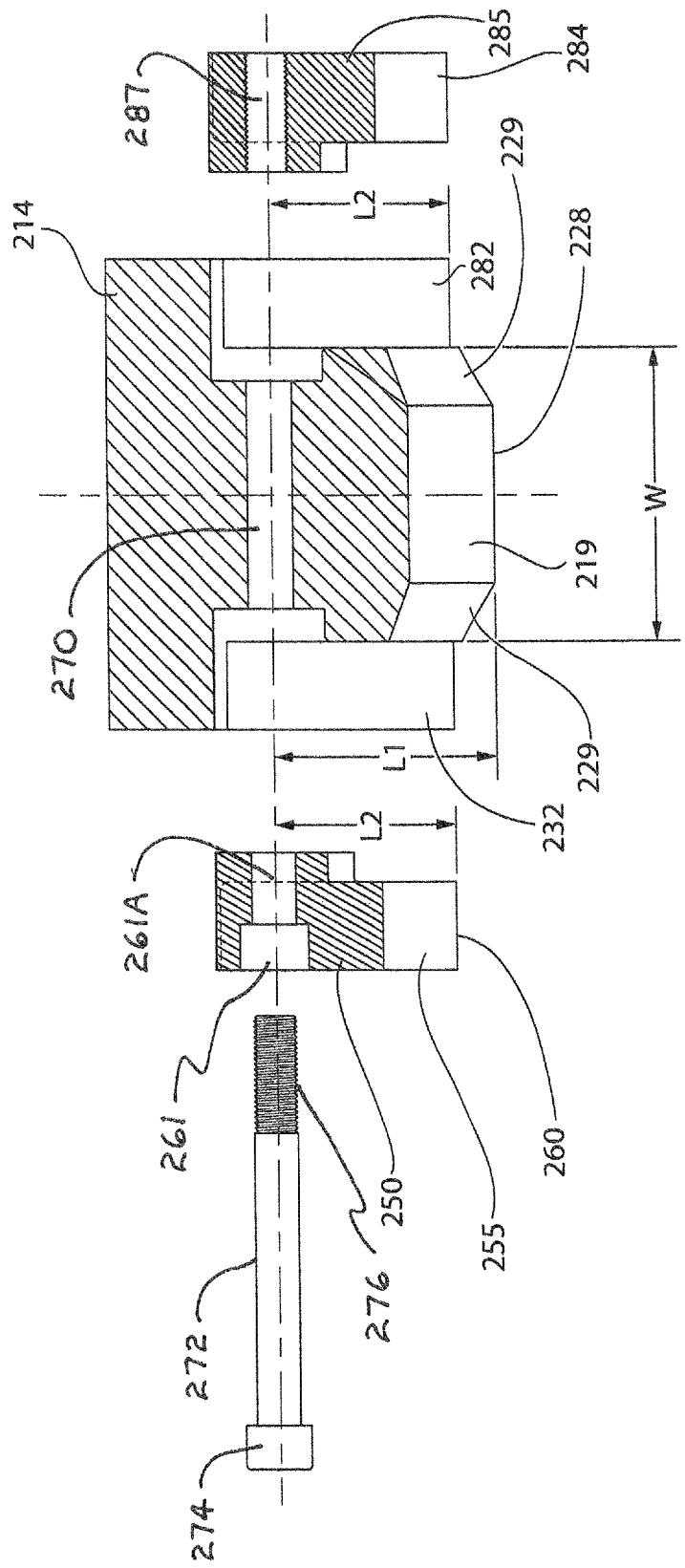
FIG. 12 is an exploded section view showing the manner by which the tips are secured to the base.
Figure 16:
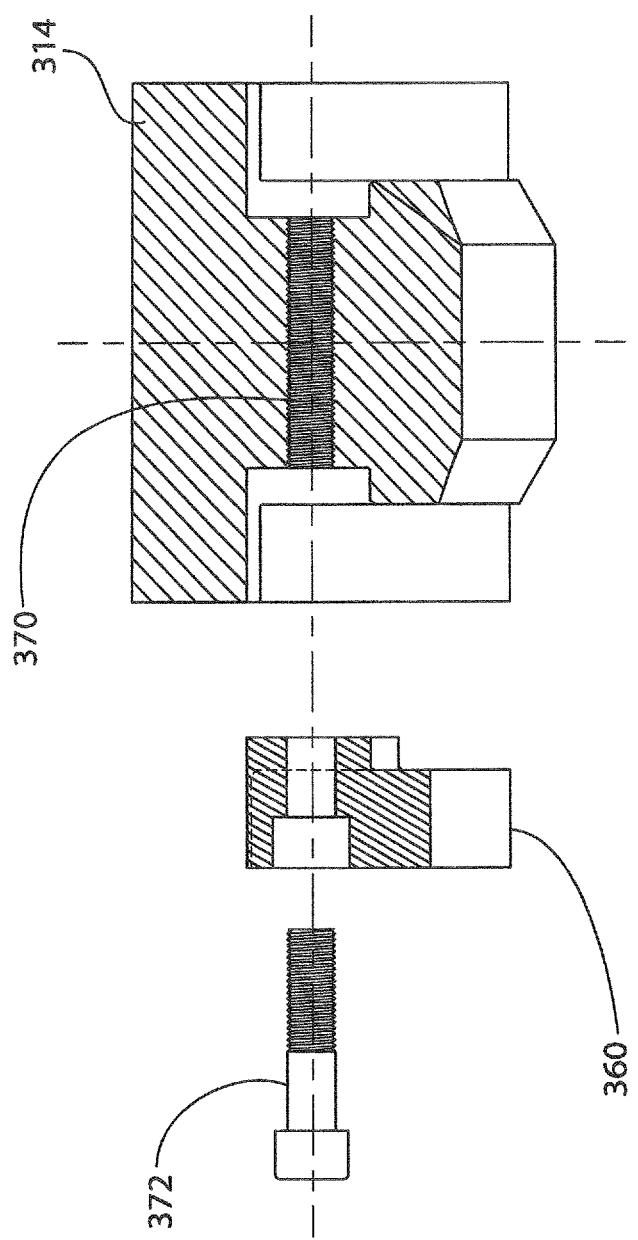
FIG. 16 is an exploded section view similar to FIG. 12 showing different features associated with the bolt and base.
Figure 17:
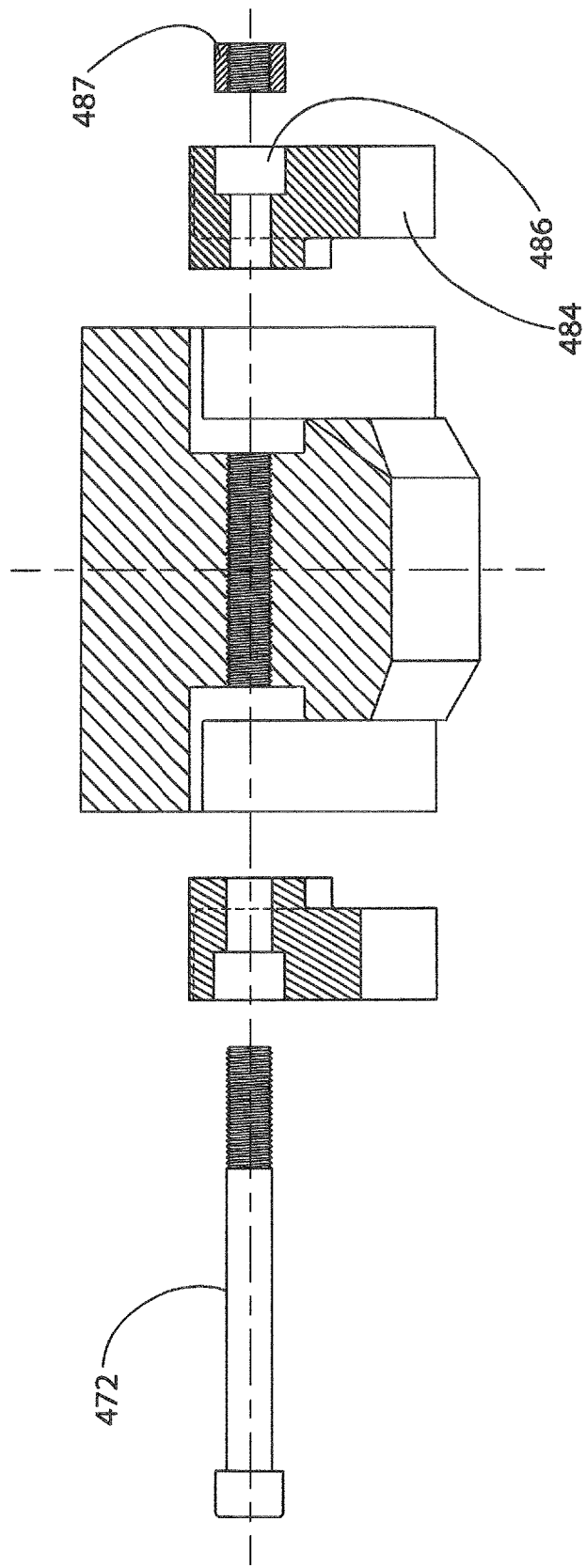
FIG. 17 is an exploded section view similar to FIG. 12 but showing other different features associated with the bolt and one insert.

Directing attention to FIG. 12, when the insert 250 is secured within the recess 232, the cutting edge 228 of the base 214 is situated below the cutting edge 260 of the insert 250. This is also true for insert 285 within the recess 282. The bolt 272 has a head 274 and a threaded end 276. The bolt 272 extends through the insert 250 and through the common bore 270 and the insert 285. The bolt head 274 fits within the countersink 261 of the insert 250 and the threaded portion 276 of the bolt 272 engages a threaded portion of the bore 287 within the insert 285. FIG. 16 shows an arrangement similar to FIG. 12, however, the bore 370 extending through the base 314 is threaded and the bolt 372 is shortened to be threaded directly into the bore 370 of the base 314 to secure insert 360, while another bolt (not shown) may be used in a similar fashion to secure an insert similar to insert 360 to the opposite side of the base 314. Additionally, rather than having a threaded base 287 for insert 284 as shown in FIG. 12 the insert 484 as illustrated in FIG. 17, may have a countersunk base 486 to receive a threaded nut 487 such that the bolt 472 is engaged with the threaded nut 487 to secure the inserts 472, 484.

Directing attention to FIGS. 9 and 9A, the keyway 240 is comprised of a radiussed segment 242 within the base 232. The segment 242 has, at an end 244 closest to the front side 219, a terminal 245 defined by a radial line R1 forming a front angle F of between 1-90 degrees with the generally planar mounting sections 235a, 235b and has at an end 246 furthest from the front side 219 a terminal 247 defined by a radial line R2 forming a back angle B of between 180-270 degrees with the generally planar mounting sections 235a, 235b. In one preferred embodiment, the front angle F is between 40 and 50 degrees and the back angle B is between 190 and 210 degrees and preferably the front angle F is 42 degrees and the back angle B is 200 degrees.

Redirecting attention to FIG. 7, the base 214 further includes a socket 266 extending into the inner wall 236 of the recess 232. The insert 250 further includes a projection 268 extending from the wall 258, wherein the projection 268 fits within the socket 266 to support the insert 250 within the recess 232. As illustrated in FIGS. 7 and 11, the socket 266 and the projection 268 having matching shapes and are non-circular, such that when the insert 250 is mounted within the recess 232, there is no relative rotation between the socket 266 and the projection 268. Insert 285 also has such a projection 268'.

The socket 266 has an upper side 267 which is continuous from and has a contour identical to the adjacent recess upper side 234. Furthermore, the projection 268 has a top side 269 which is continuous from and has a contour identical to the adjacent insert top side 252. As further illustrated, in FIG. 11, the upper side 267 of the socket 266 and the upper side 234 of the recess 232 have a profile identical to that of the insert top side 252 and the projection 268 top side 269, respectively.

As illustrated in FIGS. 7 and 8, a common bore 270 extends through the insert 250, the base 214, and the insert 285. The fastener 272 passes through the common bore 270 and secures the inserts 250, 285 within the respective recesses 232, 282. The fastener 272 made be a threaded bolt having a bolt head 274 and a threaded shaft 276. The bore 270 may include a counterbore 273 (FIG. 10) within the insert 250 to accept the bolt head 274 and, furthermore, the bore 270 within the base 214 may have threads (not shown) to accept the threaded shaft 276.

While so far a single recess 232 and a single insert 250 have been discussed in detail, a second recess 278 (FIG. 7) is associated with the opposite wall 222 of the base 214 and a second insert 285 is secured within the recess 278 in the same fashion as the insert 250 is secured within the recess 232.

In the alternative, an insert having all of the features of insert 285 with the exception of a countersunk portion of the bore to accept the nut 286 may itself have a threaded bore to accept the threaded shaft 276 of the bolt 272, thereby alleviating the need for the nut 286 and the corresponding countersunk portion within the insert 285 to accommodate the nut 286.

Returning to FIGS. 7 and 8, the mounting surface 224 of the base 214 has one of a cavity 290 extending therefrom or a projection 292 extending therefrom adapted to mate with a support surface 207 having the other of the cavity 290 or projection 292 to provide additional stability to a mounted tip 200. As illustrated in FIGS. 7 and 8, the profiles of the cavity 290 and the projection 292 are non-circular, such that the orientation and the alignment of the mounting surface 224 of the tip 200 relative to the mounting surface 207 of the support 205 may be made easier.

Figure 5:
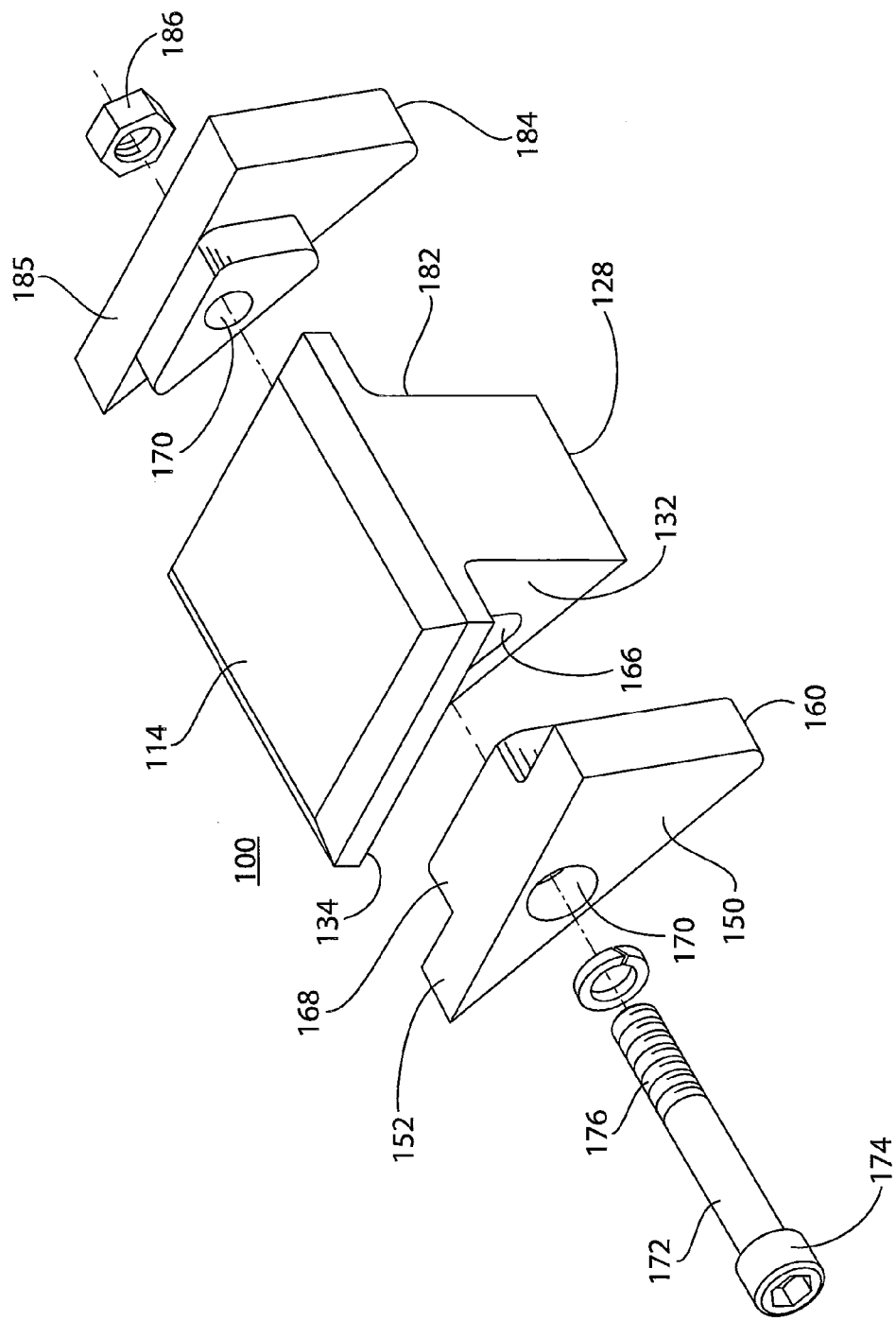
FIG. 5 is prior art and is a perspective view of a blade tip having replaceable inserts secured within a base utilizing a projection/socket arrangement.

Directing attention to FIG. 5, the prior art discloses a base 100 with a cutting edge 128 and two inserts 150, 185 with cutting edges 160, 184, respectively, whereby the cutting edges 128, 160, 184 are aligned with one another. While this arrangement provides for maximum strength since all of the cutting edges are acting in unison, there are situations in which it is desired to impart the cutting force onto a shorter length of the cutting edge, thereby improving the cutting ability of that shortened segment.

Directing attention to FIGS. 7 and 12, the front side 219 of the base 232 to the cutting edge 228 has a length L1 that is longer than the length L2 of the front side 255 of the insert 250 to the cutting edge 260 and of insert 285 to the cutting edge 284, such that the cutting edge 228 of the base 232 protrudes beyond the cutting edges 260, 284 of each insert 250, 285. As illustrated in FIG. 12, the width W of the cutting edge 228 may be shortened by including beveled edges 229 to provide a transition between the cutting edge 228 and the adjacent cutting edges 260, 284.

Figure 13:
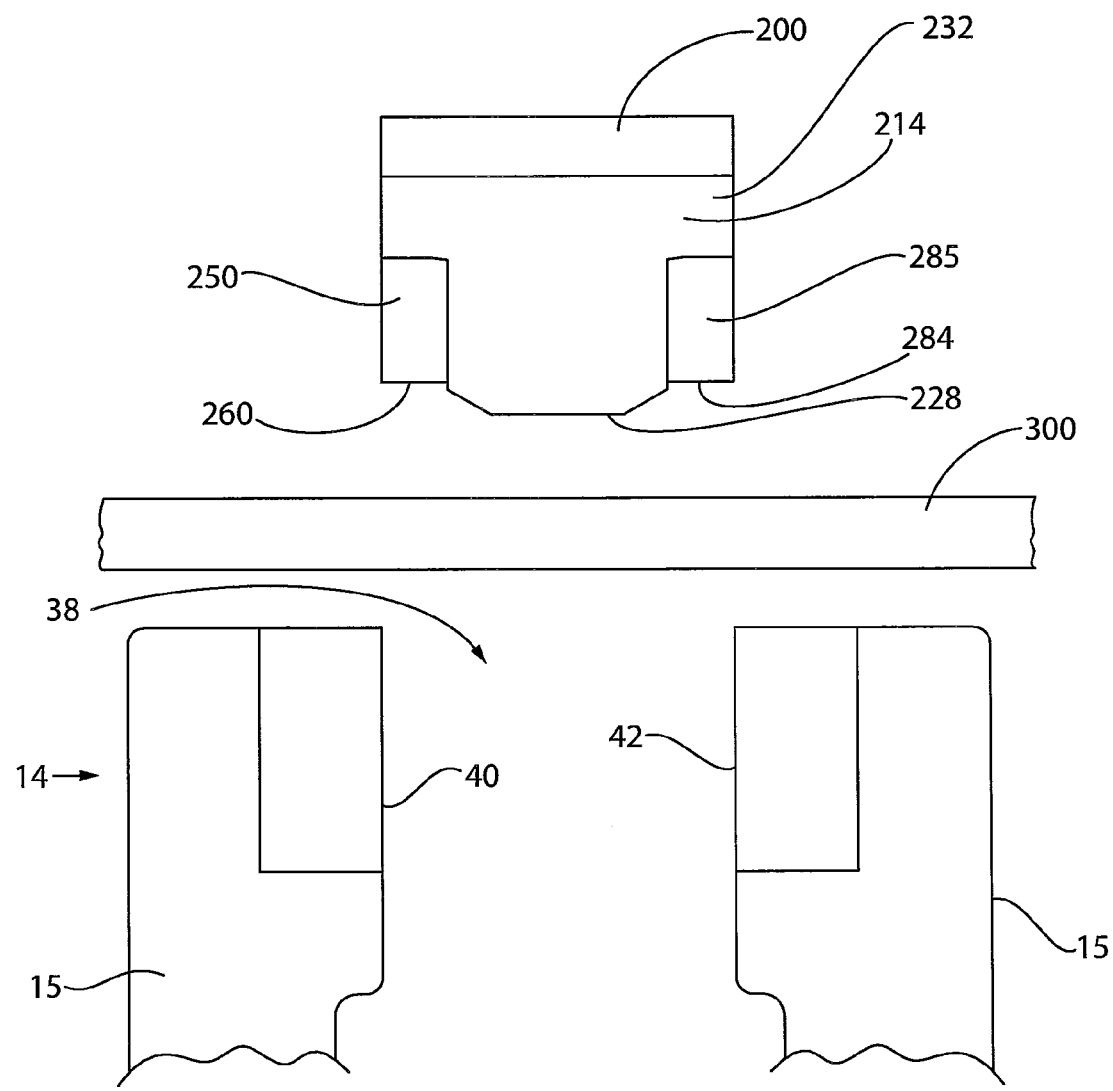
FIG. 13 is a schematic illustrating the manner by which the extended tip of the base operates on a work piece.

FIG. 13 illustrates the manner by which the cutting edge 228 of the base 232 protrudes beyond the cutting edge 260 of insert 250 and the cutting edge 284 of insert 285. In particular, the blade tip 200, for example, is part of the first blade 12 in FIG. 1 and the second blade 15 includes a guide channel 38 therebetween with opposing walls 40, 42. The shortened cutting edge 228 is urged against a work piece 300 and applies a central load thereto. The concentrated central load of the cutting edge 228 is more efficient at cutting through the work piece 300 and initiates a tearing process which is then completed by the adjacent cutting edges 260, 284 working in conjunction with the cutting edge 228.

Briefly returning to FIGS. 9 and 10, the top side 252 of insert 250 adjacent to the bore 270 has a convex radiussed extension 280 to provide additional material to the insert 250 in the region of the bore 270. Furthermore, as illustrated in FIG. 9, the upper side 234 of the recess 232 of the base 214 has a matching concave radiussed depression 282 to accept the extension 280.

What has so far been described is a keyway 240 of the base 214 and a key 265 of the insert 250 having matching arcuate edges.

Figure 14:
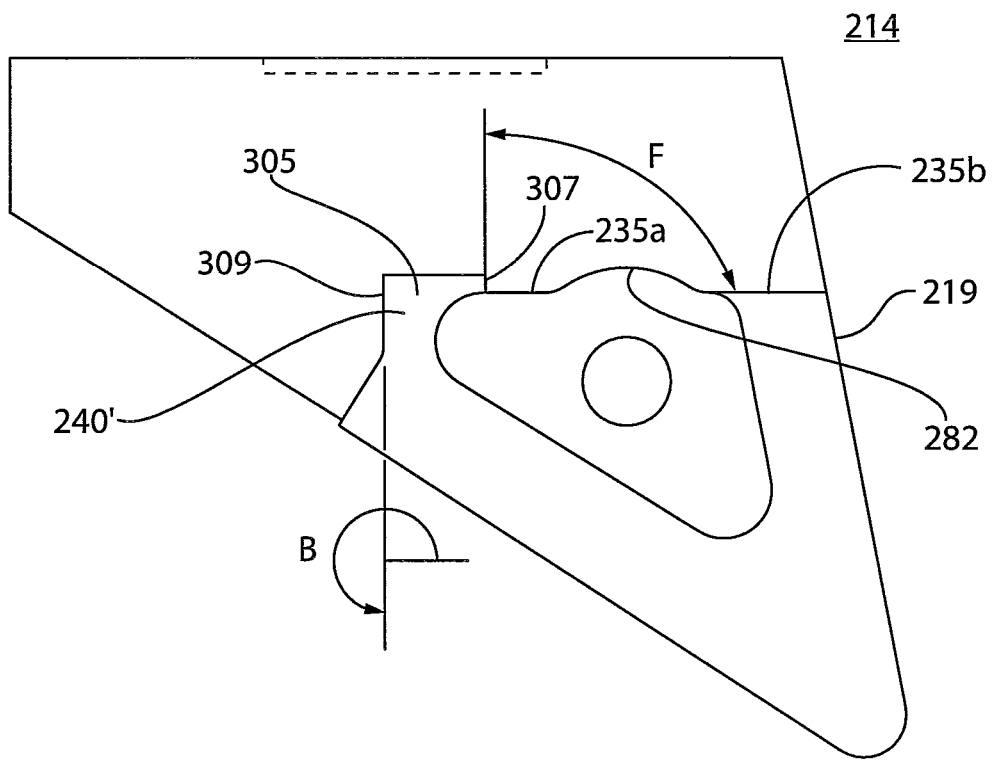
FIG. 14 is a side view of an alternate embodiment of the base.
Figure 15:
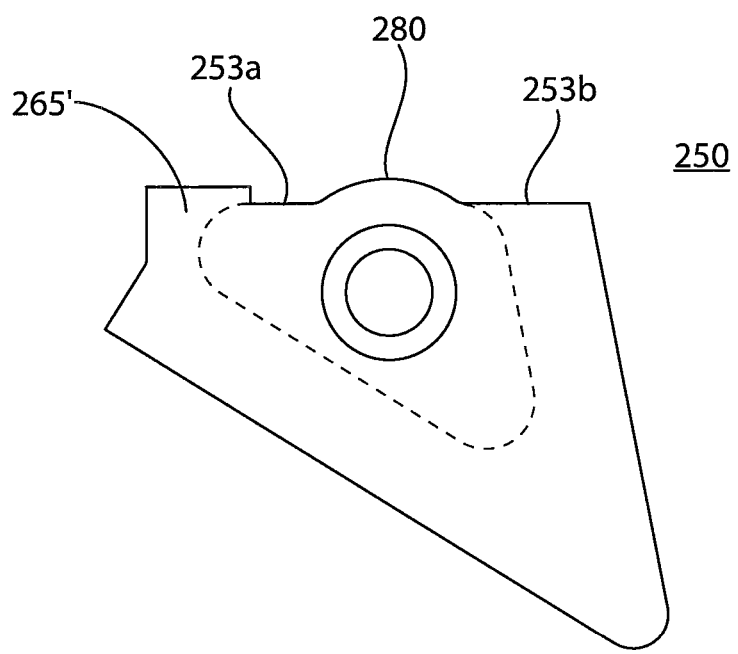
FIG. 15 is a side view of an alternate embodiment of the insert.

Directing attention to FIGS. 14 and 15, it is also possible for the keyway 240' to be comprised of a rectangular segment 305 within the base 214 having a side 307 closest to the front side 219 of the base 214 forming a front angle F of between 1-90 degrees with generally planar mounting sections 235a, 235b of the base 214 and having a side 309 farthest from the front side 219 of the base 214 forming a back angle B of between 180-270 degrees with the generally planar mounting sections 235a, 235b. Preferably, the front angle F is between 60-90 degrees and the back angle B is between 240-270 degrees and even more preferably, the front angle F is 90 degrees and the back angle B is 270 degrees. The associated insert 250 has a matching rectangular key 265' with generally planar mounting sections 253a, 253b with a convex radiussed extension 280 that mates with the concave radiussed depression 282 in the base 214.

The subject invention is also directed to a method of securing inserts 250, 285 within a tip 200 for demolition and construction equipment comprising the steps of providing a common bore 270 through the insert 250 and the walls 236, 237 of the base 214 at each recess 232, 276. Each insert 250, 285 is positioned within its respective recess 232, 276. A fastener 272 is inserted within the common bore 270 and the fastener 272 is then secured against each insert 250, 285 within the respective recess 232, 282.

It should be appreciated that under most circumstances, the only maintenance for tip 200 will be the replacement of the inserts 250, 284. However, it is possible to remove the base 214 from the support 236 to replace the entire tip 200, such that the tip 200 may be considered to be disposable. Furthermore, depending on the application for which the tip 200 may be used, the material of the base 214 and the material of the tip 200 may be different.

As a result, the tip 200 in accordance with the subject invention, machine down time and the associated expense may be significantly reduced because more tips may be quickly and easily replaced and, furthermore, the tips, when mounted within the base, are securely held to extend the life of the tips.

The invention has been described with reference to the preferred embodiments. Obvious modifications and alterations will occur to others upon reading and understanding the proceeding detail description. It is intended that the invention be construed as including all such modifications and alterations.

The invention claimed is:

1. A tip for a jaw of a jaw set for demolition and construction equipment comprising:
   a) a discrete base having:
      i) a top side, a bottom side, a front side, and walls therebetween;
      ii) a generally planar mounting surface on the top side of the base adapted to be secured to the jaw;
      iii) a central portion, having a cutting edge integral therewith whereby the cutting edge is defined at the lowermost portion of the bottom side of the base at the intersection with the front side; and
      iv) a recess extending into each wall of the base, wherein the recess defines a recess upper side, an inner wall and a generally triangular recess contour;
         1) wherein the recess upper side is a generally planar section and extends in a direction parallel to the mounting surface and;
         2) wherein the recess further includes a keyway extending within the generally planar portion of the upper side; and
   b) a pair of inserts, wherein each insert has:
      i) a top side, a bottom side, a front side, and walls therebetween defining a generally triangular shape;
      ii) a cutting edge defined at the lowermost portion of the bottom side of the insert at the intersection with the front side; and
      iii) a profile which generally conforms to the recess contour, wherein the top side has generally planar sections and further includes a key protruding from a rearward end of the generally planar sections of the top side; and
   c) wherein an insert is secured within each recess such that the top side of the insert mates with the upper side of the recess and, wherein the keyway is engaged by the key and wherein the key is captured within the keyway thereby preventing movement of the top side of the insert relative to the upper side of the recess in a direction rearward from the front side of the base to provide an enhanced interlocking arrangement between the base and the insert, and wherein the front side of the base extends beyond the front side of each insert, such that the cutting edge of the base protrudes beyond the cutting edge of each insert.

2. The tip according to claim 1, wherein the keyway is comprised of a radiussed segment within the base, wherein the segment has at an end closest to the front side a terminal defined by a radial line forming a front angle F of between 1-90 degrees with the generally planar mounting surface and having at an end furthest from the front side a terminal defined by a radial line forming a back angle B of between 180-270 degrees with the generally planar mounting surface.

3. The tip according to claim 2, wherein the front angle F is between 40-50 degrees and the back angle B is between 190-210 degrees.

4. The tip according to claim 3, wherein the front angle F is 42 degrees and the back angle B is 200 degrees.

5. The tip according to claim 1, wherein the keyway is comprised of a rectangular segment within the base having a side closest to the base front side forming a front angle F of between 1-90 degrees with the generally planar mounting surface and having a side furthest from the base front side forming a back angle B of between 180-270 degrees with the generally planar mounting surface.

6. The tip according to claim 5, wherein the front angle F is between 60-90 degrees and the back angle B is between 240-270 degrees.

7. The tip according to claim 6, wherein the front angle F is 90 degrees and the back angle B is 270 degrees.

8. The tip in accordance with claim 1, wherein the base further includes a socket extending into the inner wall of the base and, wherein the insert further includes a projection extending from one wall, wherein the projection fits within the socket to support the insert within the base.

9. The tip in accordance with claim 8, wherein the socket and projection have matching shapes and are non-circular, such that when the projection is mounted within the socket, there is no relative rotation between them.

10. The tip in accordance with claim 9, wherein the socket has an upper side which is continuous from and identical to the adjacent recess upper side and the projection has a top side which is continuous from and identical to the adjacent insert top side.

11. The tip in accordance with claim 9, wherein the upper side of the socket and upper side of the recess have a profile identical to that of the insert top side and the recess upper wall respectively.

12. The tip according to claim 1, wherein the mounting surface of the base has one of a cavity extending therein or a projection extending therefrom adapted to mate with a support surface having the other of a cavity or projection to provide additional stability to the mounted tip.

13. The tip in accordance with claim 1, further including a common bore extending through the insert walls for each insert and each base wall and further including a fastener passing through the common bore and securing each insert within each recess of the base.

14. The tip in accordance with claim 13, wherein the top side of each insert adjacent the bore has a convex radiussed extension to provide additional material to the insert in the region of the bore and the upper side of the recess at the base has a matching concave radiussed depression to accept the extension.

15. The tip in accordance with claim 1, wherein the fastener is a threaded bolt having a bolt head and threaded shaft, wherein the bore of each insert is countersunk to accept the bolt head and, wherein the bore of the base is threaded to accept the threaded shaft.

16. The tip in accordance with claim 15, wherein the fastener is a threaded bolt having a bolt head and a threaded shaft and, wherein the bore of one insert is countersunk to accept the bolt head and the bore of the other insert is threaded to accept the threaded shaft.

17. The tip in accordance with claim 16, wherein the fastener is a nut/bolt arrangement, wherein the bolt head is countersunk within one insert and the nut is countersunk within the other insert to provide a featureless outer surface.

18. For demolition and construction equipment having a jaw and mounted upon the jaw a tip comprising:
   a) a discrete base having:
      i) a top side, a bottom side, a front side, and walls therebetween;
      a generally planar mounting surface on the top side of the base adapted to be secured to the jaw;
      iii) a central portion, having a cutting edge integral therewith whereby the cutting edge is defined at the lowermost portion of the bottom side of the base at the intersection with the front side; and
      iv) a recess extending into each wall of the base, wherein the recess defines a recess upper side, an inner wall and a generally triangular recess contour;
         1) wherein the recess upper side has generally planar sections and extends in a direction parallel to the mounting surface and;
         2) wherein the recess further includes a keyway within the generally planar portions of the upper side; and
   b) a pair of inserts, wherein each insert has:
      i) a top side, a bottom side, a front side, and walls therebetween defining a generally triangular shape;
      ii) a cutting edge defined at the lowermost portion of the bottom side of the insert at the intersection with the front side; and
      iii) a profile which generally conforms to the recess contour, wherein the top side is generally planar and further includes a key protruding from each rearward end of the generally planar portion of the top side; and
   c) wherein an insert is secured within each recess such that the top side of the insert mates with the upper side of the recess and, wherein the keyway is engaged by the key to provide an interlocking arrangement between the base and the insert and wherein the key is captured within the keyway thereby preventing movement of the top side of the insert relative to the upper side of the recess in a direction rearward from the front side of the base to provide an enhanced interlocking arrangement between the base and the insert, and wherein the front side of the base extends beyond the front side of each insert, such that the cutting edge of the base protrudes beyond the cutting edge of each insert.

19. A method of securing inserts having a generally triangular shape within a jaw of a jaw set for demolition and construction equipment having a discrete base with a top side, a bottom side and walls therebetween, a generally planar mounting surface on the top side of the base adapted to be secured to the jaw, a central portion, having a cutting edge integral therewith whereby the cutting edge is defined at the lowermost portion of the bottom side of the base at the intersection with the front side, and recesses extending into two opposing walls of the base, wherein each recess defines a recess upper wall, an inner wall and a generally triangular recess contour, wherein the base recess includes a keyway within the generally planar sections of the upper side and wherein each insert has a top side with generally planar sections and includes a key protruding from the generally planar sections of the top side and wherein the front side of the base extends beyond the front side of each insert, such that the cutting edge of the base protrudes beyond the cutting edge of each insert, wherein the method comprises the steps of:
  a) providing a common bore through the insert and the walls of the base at each recess;
  b) positioning an insert within each recess;
  c) inserting a fastener therethrough; and
  d) securing the fastener against each insert within the recess.

* * * * *